(No Model.)

J. LIST & W. B. SMITH.
COFFEE MAKING MACHINE.

No. 517,283. Patented Mar. 27, 1894.

4 Sheets—Sheet 2.

WITNESSES
George Baumann
J. C. Connor

INVENTORS
John List and William B. Smith
By their Attorneys
Howson & Howson

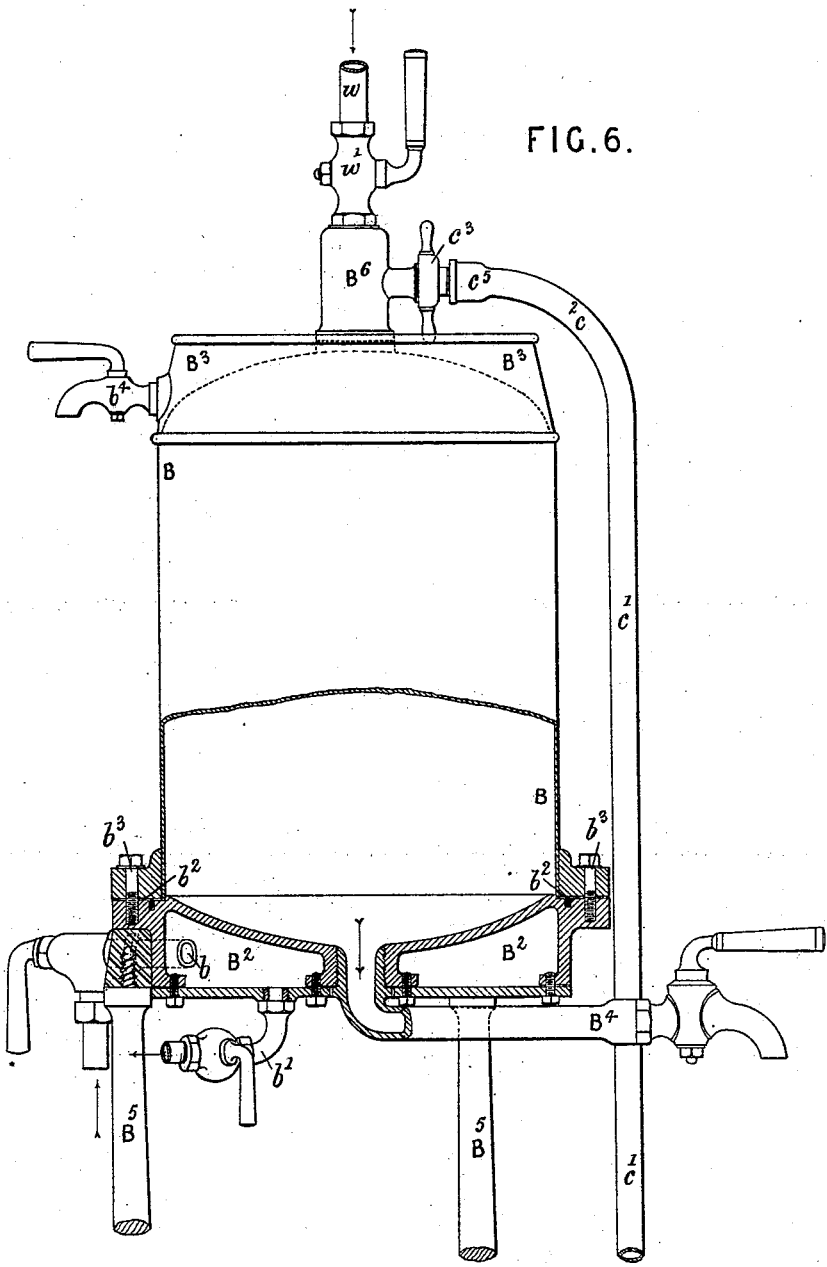

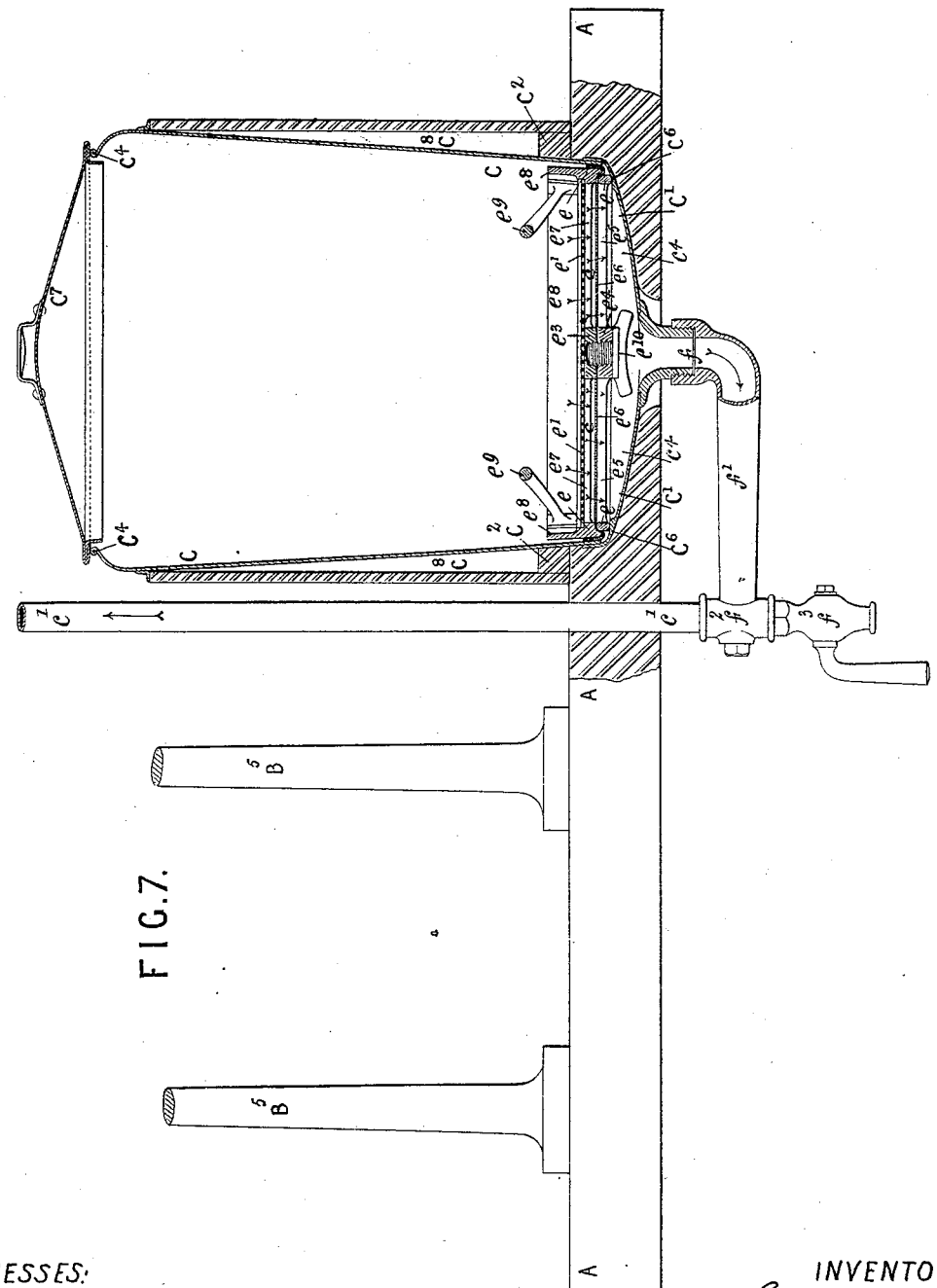

UNITED STATES PATENT OFFICE.

JOHN LIST, OF LONDON, ENGLAND, AND WILLIAM BROWNHILL SMITH, OF GLASGOW, SCOTLAND.

COFFEE-MAKING MACHINE.

SPECIFICATION forming part of Letters Patent No. 517,283, dated March 27, 1894.

Application filed October 26, 1892. Serial No. 449,981. (No model.) Patented in England July 8, 1890, No. 10,576, and December 10, 1891, No. 21,618.

*To all whom it may concern:*

Be it known that we, JOHN LIST, of Blackheath, London, in the county of Kent, England, and WILLIAM BROWNHILL SMITH, of Glasgow, in the county of Lanark, Scotland, subjects of the Queen of Great Britain and Ireland, have invented an Improved Coffee-Making Machine, (which has been patented in Great Britain July 8, 1890, No. 10,576, and December 10, 1891, No. 21,618,) of which the following is a specification.

This invention has reference to an improved construction of boiler and arrangement and combination of infusing and filtering vessel and connecting fittings to form a machine for the boiling and infusing of coffee clear of sediment and fine "grounds," and especially suitable for use on board ship.

The improvements essentially consist in the combination with the coffee boiler of a separate jacketed chamber heated by steam, hot-air, or other fluid, and in constructing the boiler in two parts connected together by a fluid-tight joint. In combining with the boiler and infusing vessel a double action three-way cock, filtering appliances, and connecting fittings and in order to enable others skilled in the art to which our invention relates to understand how it may be put into practice we have hereunto appended four sheets of explanatory drawings in which the same reference letters are used to indicate corresponding parts in all the figures where shown.

Figure 1:
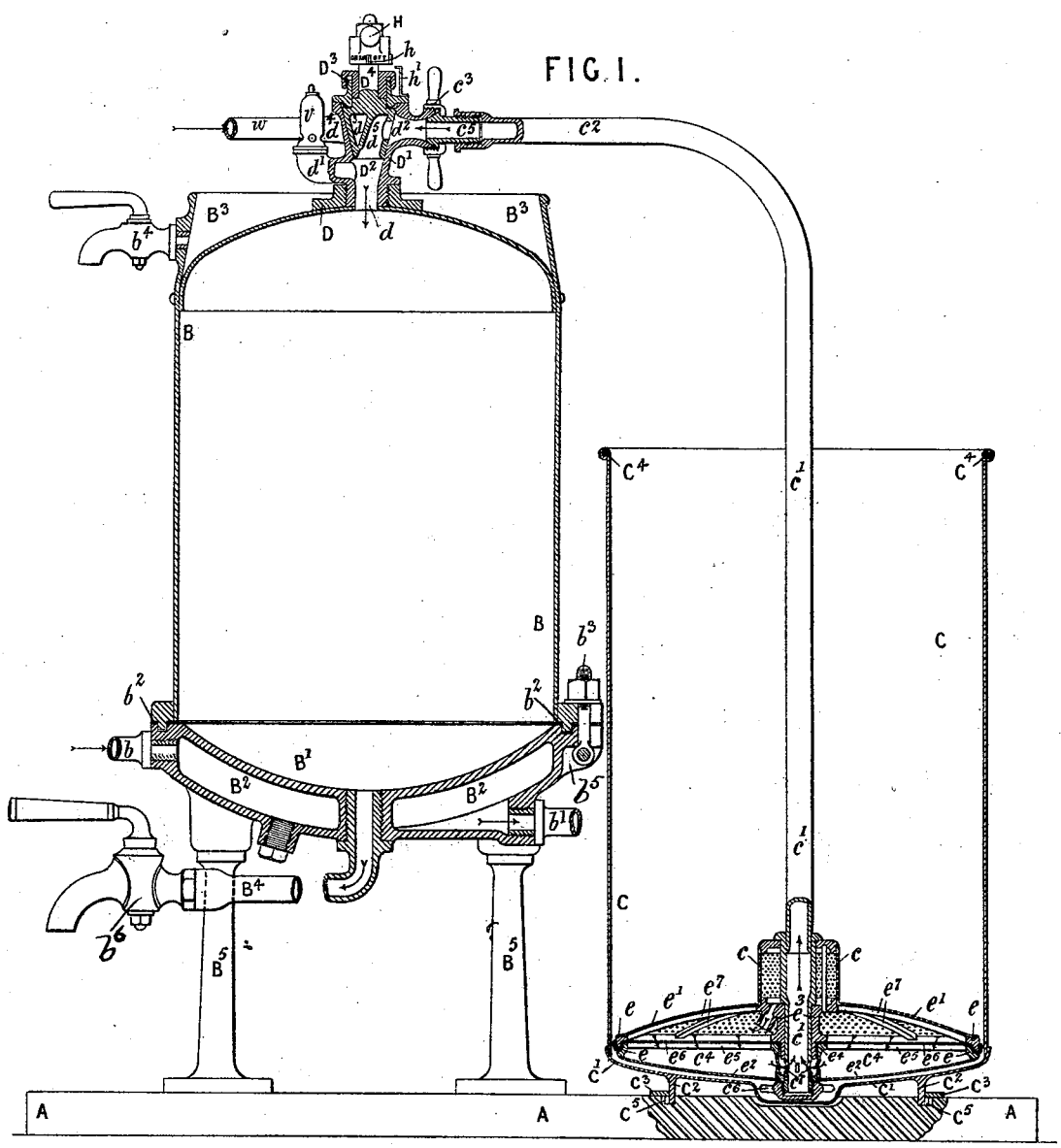
Figure 2:
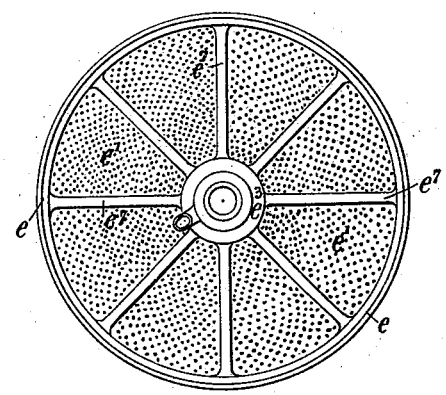
Figure 3:
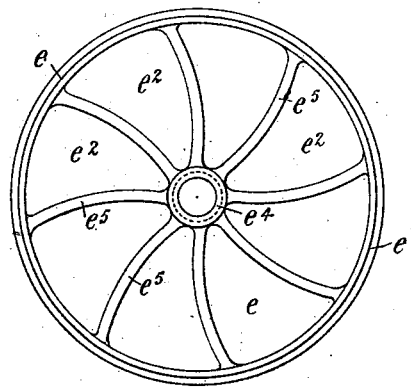
Figure 4:
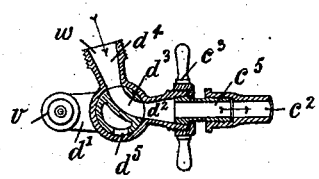
Figure 5:
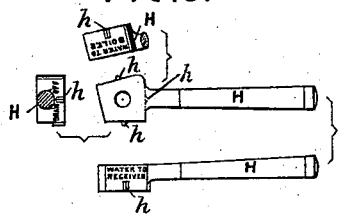

Figure 1 is a sectional elevation showing one arrangement of our improved coffee boiler and infusing vessel and filters and connecting fittings. Figs. 2 and 3 are detached face views looking from the inside of the upper and lower parts of the filter. Figs. 4 and 5 are detached sectional views of the three-way cock shown in sectional elevation on the top of the boiler in Fig. 1; and Figs. 6 and 7 show in sectional elevation a modified arrangement of the coffee making machine and its connecting and filtering appliances, from that shown in Figs. 1 to 5.

Referring to Figs. 1 to 5 of the drawings—the boiler B and infusing vessel C are arranged side by side over a sole plate A. The boiler is made in two parts B B' preferably cylindrical in the vertical direction and with domed upper and lower ends concave on the inner surface, the lower end B' being cast preferably in gun metal in a jacketed close cased form at $B^2$ into which heated steam would be admitted as hereinafter described. The steam jacket $B^2$ is fitted with a steam branch at $b$ and with condensed water drain off branch at $b'$. This jacketed case $B^2$, is erected on the sole plate A, upon three short flanged screw studs $B^5$, so arranged above the sole plate A, as to admit of the attachment of said pipes at $b\ b'$ to the steam and draining off branches. A branch $B^4$ is also fitted and screwed up through the jacketed case $B^2$ in the center for drawing off the coffee from the boiler B. All the branches $b\ b'$ and $B^4$ of this lower part $B^2$ are fitted with suitable closing valves $b^6$ as shown in Fig. 6 and on branch $B^4$, Fig. 1. The upper part of this jacketed bottom $B^2$, and the lower part of the cylinder boiler B are formed with joint flanges having an annular groove and tongue hydraulic joint at $b^2$, and fitted with a number of screw bolts $b^3$ preferably jointed to lugs $b^5$ in the lower part B' to fold in and out of slots in both flanges, as shown in Fig. 1, to admit of the easy removal of the upper part B of the boiler from the lower part B' for cleaning purposes. This whole upper part B is preferably formed of sheet copper, and has its lower flange brazed on and has a water cooling trough $B^3$ over its upper dome for the admission of cold water for cooling this and producing a vacuum within. A small screw socket D is fitted to the inlet hole in the center of the domed top, into which is screwed the lower branch $d$ of the case D' of an improved arrangement of double action cock $D^2$ with safety spring valve $v$ on a branch $d'$ of the case D', and with two coupling branches $d^2$, $d^4$, all constructed as hereinafter described with the parts portable and removable for cleaning purposes. The removable filtering and infusing vessel C is made cylindrical preferably of copper with a close and domed bottom C', and open curved-in strengthening lips $C^4$ at top so designed and secured by a rim $C^2$ at bottom to a fixed metal ring $C^3$ on the sole plate A by segmental projections $C^5$ passing through corresponding segmental slots in the ring $C^3$, as to form a bayonet joint on opposite sides easily inserted for securing the vessel and removing it. The ground coffee to be infused or boiled is placed in the bottom of the vessel C which is fitted with a circular hollow thin metal filter $c$ full of perforations, and a compound strainer $e'$, $e^2$, mounted liquid tight on the hollow close ended stem $c'$ of a siphon tube $c'$, $c^2$, secured to it by a hand screw nut $c^6$ below, and having lateral openings at $c^7$, through the sides of the tube $c'$, $c^2$, within the strainer all for easy removal, and cleaning, and for the passage of the infused coffee through the strainer and up the tube $c'$, $c^2$, when being drawn over into the boiler B. The upper end at $c^5$ of the siphon tubes $c'$, $c^2$, is fitted with a hand screw coupling $c^3$ for securing it to the branch $d^2$ of the double action cock $D'$, $D^2$, before mentioned. This double action cock $D'$ is fitted with a plug $D^2$, having a spindle $D^4$ passing up through a screw stuffing box in the cover $D^3$ of the cock case $D'$ and having also a handle H screwed to the spindle $D^4$ with pointers $h$ on its three sides, and having directions cut on the three faces of the handle H over the pointers $h$, and with a fixed style or main pointer $h'$ projecting up from the top $D^3$ of the cock, so as to be able in turning the cock to set any of the pointers $h$ in line with the fixed pointer $h'$ to give either water to the boiler B or to the mixing vessel C, or to draw off coffee from mixer C to boiler B, and which latter is the same position as permits steam to pass from boiler B to mixer C, the details of handle of cock being shown in Fig. 5. The plug $D^2$ of this cock $D'$, $D^2$, is made hollow with an opening in its lower end direct down to the branch $d$, and also with a side port $d^5$ opening down into this. The body or chest of the cock has a screw coupling lateral branch at $d^4$, near the top on one side, to which branch the water supply pipe $w$ is coupled. The plug $D^2$ is also formed with a lateral curved port $d^3$ through it, so that in one position it would lead the water supply into the branch $d^2$ and down into the siphon tube $c'$, $c^2$, of the filtering vessel C, as seen in the horizontal section of the cock Fig. 4 to mix water with the ground coffee. In another position of the plug $D^2$, and hand lever H, the before mentioned side port $d^5$ would pass water from the branch $d^4$ down into the central boiling vessel B for raising steam in it to boil the coffee in the filtering vessel C, or for cleaning out purposes; while another position of the plug $D^2$ and hand lever H, would bring this side port $d^5$, in line with the branch $d^2$ leading to the siphon pipe $c'$, $c^2$, and strainer, as indicated in the vertical sectional elevation of the cock $D'$, $D^2$, in Fig. 1, and thus pass steam up from the central boiling vessel B, to the infusing and filtering vessel C to boil the coffee therein, and when this is done, the infused coffee is driven back again through the pipe $c'$, $c^2$, filtered through the strainer $c$, $e$, $e'$, $e^2$, and through the branch and port $d^2$, $d^5$, $d$, into the central boiling vessel B, by atmospheric pressure, a vacuum being formed therein by shutting off the heating steam from the jacket $B^2$ and allowing the steam within the vessel B to condense, by filling cold water into the receiver $B^3$ above the dome of the vessel B, and which is fitted with a drain cock at $b^4$ for drawing off the cold water. A small safety valve $v$ is also fitted over the branch $d'$ of the cock $D'$ as before mentioned, to prevent the pressure of steam within the boiler B, being raised to more than a few pounds per square inch above that of the atmosphere. The infused liquid coffee decanted from the filtering vessel C to the boiler B would be kept hot in the latter vessel by steam admitted to the jacket $B^2$, and can be periodically drawn off as required through a tap $b^6$ on the lower branch pipe $B^4$.

The portable strainer is fitted with two separate flat or concave disks $e'$, $e^2$, which are soldered at the periphery to upper and lower jointing checked rings $e$, fitting into each other and at the center to upper and lower ferrules $e^3$, $e^4$, and which rings and ferrules fit closely together at the center and when so fitted together form a hollow strainer filter. The upper disk $e'$ consists of finely perforated sheet metal, preferably supported on and soldered to the rim at $e$ and center ferrule $e^3$ below the upper filter chamber $c$ and rests on radial ribs $e^7$ which connect the rim $e$ with the ferrule $e^3$ and which gives rigidity to the outer rim and disk $e$ $e'$. The lower disk $e^2$, consists of a sheet of unperforated metal soldered to its rim $e$ and center ferrule $e^4$, as in the case of the upper disk $e'$, it has also a set of ribs $e^5$, across its upper part, upon which is laid a layer of filtering cloth $e^6$. The filtering material $e^6$ thus forms a filtering diaphragm between the upper and lower disks $e'$, $e^2$, when they are fitted together, and it is gripped tightly at the center between the abutting faces of the ferrules $e^3$, $e^4$, and at the periphery between the abutting faces of the rings $e$. Through the center ferrules $e^3$, $e^4$, the lower end of the siphon tube $c'$ passes and it is formed with perforations $c^7$, below the plane of the filter diaphragm $e^6$ and there are corresponding perforations in the center ferrule $e^4$ of the lower disk only. The end of the siphon tube $c'$ is closed by the close bottomed screw nut $c^6$, this nut pressing and holding the upper and lower disks of the strainer firmly together.

In a compound strainer filter of the above described improved construction; the infusion of coffee passes first through the strainer of the upper chamber $c$ and perforated sheet metal $e'$ upon which is caught all the coarse sediment or "grounds" and then through the filter material $e^6$ upon which the fine sediment is caught, the infusion then passes into the division $c^4$ below it, and then through the openings $c^7$ into the siphon tube $c'$, clear and free from any particles of coffee held in suspension, and then through the three-way cock D', D², into the boiler B from which it is drawn off by the lower tube and cock B⁴, all as previously described and indicated by the darts in Fig. 1. By removing the nut $c^6$ from the end of the siphon tube $c'$, the strainer filter $e$, $e'$, $e^2$, can be detached from it and it can then be readily taken apart at the joint and filter for cleaning and for the renewal of the filtering medium $e^6$. Referring to Figs. 6 and 7 in this arrangement the bottom of the boiler B is placed at a higher level than the top of the filtering vessel C for the lower discharge branch B⁴, and cock to fill warm water from the boiler B direct over the top of and into the infusing vessel C, for infusing the coffee or washing the vessel. To prevent radiation or loss of heat, the vessel C is shown as fitted with a portable metal cover C⁷, and it may also be lagged with suitable non-conducting material as shown at C⁸. The bottom C' of the vessel C is made dished in form and from the center of the bottom is carried a radial draw-off branch $f$ and tube $f'$ which passes outside the bottom C'. This radial pipe $f'$ is coupled and connected at $f^2$ to a lower part of the vertical siphon pipe $c'$, which in this case passes up outside the infusing vessel C, and is coupled at $c^3$ to a simple branch B⁶ on the top of the boiler B, and this branch B⁶ has a water branch $w$ and cock $w'$ attached to it.

The fixed vertical pipe $c'$ connected to the above described radial draw off pipe $f'$ takes the place of the portable siphon pipe $c'$, $c^2$, described in the arrangement shown in Fig. 1. To admit of these fixed pipes and the infusing vessel being washed out, a drain cock $f^3$ is fitted to the lowest part of the radial draw off pipe $c'$ and branch $f'$.

The filter to be used with the above described infusing vessel C is a modified form of the compound strainer-filter hereinbefore described in reference to Figs. 1 to 5, it takes in this case however the form of a portable circular horizontal sieve which can be readily inserted in and removed from the lower part of the interior of the infusing vessel C. This sieve strainer filter consists of an upper and a lower part, divided at the filter diaphragm $e^6$. In this case the upper part $e$, $e'$, of the filter is formed with an upstanding rim $e^8$ connected at its lower edge by the radial ribs $e^7$ to a small center solid boss circular plate $e^3$. On these ribs is laid a disk $e'$, of finely perforated sheet metal which rests on the upper surface of these ribs $e^7$ and soldered or attached to the upper surface of the center boss plate $e^3$ as well as to a ledge projecting inward from the lower part of the upstanding rim $e$. This sieve tray $e$, $e'$, is provided with two handles $e^9$ attached to the inside of the rim $e^8$, so that it can be readily lifted in or out of the vessel C. To the under side of this sieve $e$, $e'$, is attached a frame consisting of a shallow metal rim fitting into the upper one $e$, and having radial ribs $e^5$ connecting it with a center boss plate $e^4$. Through this center plate $e^4$ of the lower frame passes the stem of a hand screw $e^{10}$, which is tapped into the under side of the upper center plate $c^3$ of the sieve and which is formed with a butterfly head, so that it can easily be screwed up with the fingers and thumb. The outer rim $e$ of the lower frame $e^4$, $e^5$, fits into a groove on the under side of the upper sieve rim $e'$ and is firmly held against it by the pressure of the center screw $e^{10}$. Between the under side of the sieve $e'$ and the upper surface of the lower frame $e$, $e^5$, is inserted a disk $e^6$, of filtering material which lies on the surface of the ribs $e^5$ of the lower frame. The relative positions of the upper surface of the filter material $e^6$ and the under side of the metal strainer $e'$, are so arranged that there is sufficient space $c$ left between them for the accumulation of fine sediment. The circular sheet of filtering material $e^6$ is of such a diameter that it projects about half an inch beyond the joint of the rims $e$ of the frame, and of the sieve; and the diameter of the rim $e^8$, of the sieve is so arranged that when the latter is pressed down into the infusing vessel C, the projecting rim of filtering material $e^6$ is turned up all round and forms practically a tight joint between the outside of the rim $e^8$ of the sieve and the inside of the infusing vessel C. The sieve is pushed down until the frame which is attached to it underneath, rests on a ledge formed around the periphery of the inside of the bottom of the infusing vessel C at C⁶. In this way a portable compound strainer filter is fitted on the vessel C leaving a shallow space $c^4$ below it which is in communication by the branch $f, f'$, with the fixed siphon radial tube $c'$ to the boiler B. The infusing, straining, and filtering of the coffee may be carried on exactly as in the case of a machine with the strainer-filter attached to the portable siphon pipe $c'$, $c^2$, up the center of the vessel C. The coarse "grounds" or sediment is caught up by the metal strainer $e'$ and the fine sediment on the filter cloth $e^6$ within the space $c$. After the coffee is drawn over, the sieve is lifted out of the vessel C with the coarser "grounds" in it above the metal sieve $e'$, and the lower frame $e^4$, $e^5$, can then be readily detached and the whole cleaned, and the filter material $e^6$ renewed when necessary.

What we claim is—

1. A coffee making machine consisting of an infusing vessel and a boiler in combination with a pipe leading from the bottom of the infusing vessel to the top of the boiler, a water supply pipe connected to the aforesaid pipe, and a cock at the connection controlling the water supply to both the boiler and the infusing vessel, and controlling also the connection between the boiler and the infusing vessel, substantially as and for the purposes set forth.

2. In a coffee making machine the combination comprising a steam heated boiler, an infusing vessel, an inflow and outflow connecting pipe, and a portable hollow perforated disk filter formed in two parts for the insertion of a filtering cloth disk between them fitted in the bottom of the receiver, substantially as and for the purposes set forth.

In testimony whereof we have signed our names to this specification in the presence of two subscribing witnesses.

JOHN LIST.
WILLIAM BROWNHILL SMITH.

Witnesses:
JOHN SEINE,
THOS. S. DUFFIE,
*Both of 96 Buchanan Street, Glasgow.*